United States Patent
Alahyari et al.

(10) Patent No.: US 12,455,100 B2
(45) Date of Patent: Oct. 28, 2025

(54) CRYOCOOLER WITH TRANSIENT THERMAL STORAGE

(71) Applicant: Hamilton Sundstrand Corporation, Charlotte, NC (US)

(72) Inventors: Abbas A. Alahyari, Glastonbury, CT (US); Parag M. Kshirsagar, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 288 days.

(21) Appl. No.: 17/962,048

(22) Filed: Oct. 7, 2022

(65) Prior Publication Data
US 2024/0118004 A1   Apr. 11, 2024

(51) Int. Cl.
| | |
|---|---|
| F25B 9/10 | (2006.01) |
| B64D 27/24 | (2024.01) |
| B64D 33/08 | (2006.01) |
| H02K 55/00 | (2006.01) |

(52) U.S. Cl.
CPC ............ *F25B 9/10* (2013.01); *B64D 27/24* (2013.01); *B64D 33/08* (2013.01); *F25B 2400/24* (2013.01); *H02K 55/00* (2013.01)

(58) Field of Classification Search
None
See application file for complete search history.

(56) References Cited

U.S. PATENT DOCUMENTS

| | | | |
|---|---|---|---|
| 6,330,800 B1 | 12/2001 | Price et al. | |
| 9,261,295 B1 * | 2/2016 | Schmidt | F17C 9/00 |
| 11,092,031 B2 | 8/2021 | Frank et al. | |
| 2006/0097146 A1 | 5/2006 | Strobel | |
| 2007/0186560 A1 | 8/2007 | Schauwecker et al. | |

FOREIGN PATENT DOCUMENTS

| | | | |
|---|---|---|---|
| EP | 1498670 A2 | 1/2005 | |
| EP | 2562489 A1 | 2/2013 | |
| EP | 3477223 A1 | 5/2019 | |
| GB | 2548123 A | 9/2017 | |
| JP | 6901964 B2 * | 7/2021 | ............. F25B 41/20 |
| WO | WO-2023161594 A1 * | 8/2023 | |

OTHER PUBLICATIONS

European Search Report Application No. 23189593.9, mailed Feb. 6, 2024, 6 pages.

* cited by examiner

*Primary Examiner* — Jenna M Maroney
(74) *Attorney, Agent, or Firm* — CANTOR COLBURN LLP

(57) ABSTRACT

A cryocooler device including a cryocooler including an input and an output, the input forming a cooling path, and a first stage that cools a working fluid in the cooling path. At least one thermal energy storage device selectively connectable to the cooling path and the cooling loop, wherein in a first operational mode of the cryocooler device where the at least one thermal energy storage device is connected to the cooling loop where the heat to be removed at the input exceeds a cooling capacity of the cryocooler device, and a second operational mode where the at least one thermal energy storage device is connected to the cooling path where the heat to be removed is less than the cooling capacity of the cryocooler and the heat is removed from the at least one thermal energy storage device.

15 Claims, 7 Drawing Sheets

CRYOCOOLER WITH TRANSIENT THERMAL STORAGE

STATEMENT OF FEDERAL SUPPORT

This invention was made with government support under Government Contract No. DE-AR0001404 awarded by the Department of Energy. The government has certain rights in the invention.

TECHNICAL FIELD

This disclosure relates cooling electric engines and, more particularly, to a cryocooling device that includes a device for cooling energy when the cryocooling device is operating below peak operating levels.

BACKGROUND

Some components of an aircraft such as superconducting electric motors and drives, may need to be cooled to cryogenic temperatures of about 77° K or less to function properly. A number of approaches are available including thermal contact to liquefied gases and cryogenic refrigerators, usually termed cryocoolers.

One type of cryocooler functions by the expansion of a gas, which absorbs heat from the surroundings. Intermediate temperatures in the cooling component may be reached using a single-stage expansion. To reach colder temperatures, such as about 40° K or less, a multiple-stage expansion cooler may be used. Another type of cryocooler is a magnetocaloric cooler. These cryocoolers achieve the low temperatures in several refrigeration stages through adiabatic magnetization and demagnetization of certain magnetocaloric material.

The cryocooler must be capable of maintaining the operating temperature for the component being cooled, regardless of this variation in heat loading and the temporary high levels. While it handles this variation in heat loading, the cryocooler desirably would draw a roughly constant power level, so that there are no wide swings in the power requirements that would necessitate designing the power source to accommodate the variation. One possible solution to the problem is to size the cryocooler to handle the maximum possible heat loading. This solution has the drawback that the cryocooler is built larger than necessary for steady-state conditions, adding unnecessarily to the size and weight of an aircraft.

BRIEF SUMMARY

Disclosed is a cryocooler device. The device includes a cryocooler that has an input and an output. The input forms a cooling path. The device also includes a first stage that cools a working fluid in the cooling path. The device also includes a cooling loop thermally connected to the first stage that transfers heat away from the first stage towards the output of the cryocooler and at least one thermal energy storage device selectively connectable to the cooling path and the cooling loop. In a first operational mode of the cryocooler device, the at least one thermal energy storage device is connected to the cooling loop where the heat to be removed at the input exceeds a cooling capacity of the cryocooler device. Further, in a second operational mode, wherein the at least one thermal energy storage device is connected to the cooling path where the heat to be removed is less than the cooling capacity of the cryocooler and the heat is removed from the at least one thermal energy storage device.

In addition to one or more of the features described above, or as an alternative to any of the foregoing embodiments, the device can include a working fluid selected from the group consisting of Neon, Argon, Methane, Helium, Hydrogen, and Nitrogen.

In addition to one or more of the features described above, or as an alternative to any of the foregoing embodiments, the cryocooler can be a sterling cryocooler, a magnetocaloric cryocooler, pulse tube cryocooler, a helium cryocooler, or a polycold cryocooler.

In addition to one or more of the features described above, or as an alternative to any of the foregoing embodiments, the cryocooler can contain multiple stages and multiple cooling loops.

In addition to one or more of the features described above, or as an alternative to any of the foregoing embodiments, the cryocooler can contain at least two stages and at least two cooling loops.

In addition to one or more of the features described above, or as an alternative to any of the foregoing embodiments, the cryocooler device can contain a first cooling loop of the cryocooler that transfers heat away from the first stage towards the output connected to the cryocooler. The device also includes a thermal energy storage device, which is arranged along the cooling path and the first cooling loop.

In addition to one or more of the features described above, or as an alternative to any of the foregoing embodiments, the device contains a second cooling loop that transfers heat away from the second stage towards the output connected to the cryocooler. The device also includes a thermal energy storage device, which is arranged along the cooling path and the second cooling loop.

In addition to one or more of the features described above, or as an alternative to any of the foregoing embodiments, the cryocooler can contain multiple stages, multiple cooling loops, and multiple thermal energy storage devices.

In addition to one or more of the features described above, or as an alternative to any of the foregoing embodiments, the cryocooler can contain at least two stages, at least two cooling loops, and at least two thermal energy storage devices.

In addition to one or more of the features described above, or as an alternative to any of the foregoing embodiments, the cryocooler device may contain a first cooling loop that transfers heat away from the first stage towards the output connected to the cryocooler. The device also contains a first thermal energy storage device, that is arranged along the cooling path and the first cooling loop. The second cooling loop transfers heat away from the second stage towards the output connected to the cryocooler. The device also contains a second thermal energy storage device, that is arranged along the cooling path and the second cooling loop.

In addition to one or more of the features described above, or as an alternative to any of the foregoing embodiments, an aircraft system comprising an electric engine and a cryocooler device in thermal communication with the electric engine that cools the electric engine. The cryocooler device comprises a cryocooler including an input and an output. The input forming a cooling path, and a first stage that cools a working fluid in the cooling path; a cooling loop thermally connected to the first stage that transfers heat away from the first stage towards the output of the cryocooler. The device also contains at least one thermal energy storage device selectively connectable to the cooling path and the cooling loop. In a first operational mode of the cryocooler device, the thermal energy storage device is connected to the cooling loop, such that the heat to be removed at the input exceeds a cooling capacity of the cryocooler device. In a second operational mode, the thermal energy storage device is connected to the cooling path, such that the heat to be removed is less than the cooling capacity of the cryocooler and the heat is removed from the at least one thermal energy storage device. The thermal energy storage device includes a working fluid selected from the group consisting of Neon, Argon, Methane, Helium, Hydrogen, and Nitrogen.

In addition to one or more of the features described above, or as an alternative to any of the foregoing embodiments, an aircraft system comprising an electric engine and a cryocooler device. The device also contains a cryocooler, which may be a sterling cryocooler, a magnetocaloric cryocooler, pulse tube cryocooler, a helium cryocooler, or a polycold cryocooler. Further, the cryocooler contains multiple stages and multiple cooling loops. Further disclosed, is a cryocooler that contains at least two stages and at least two cooling loops.

In addition to one or more of the features described above, or as an alternative to any of the foregoing embodiments, a cryocooler device, wherein the first cooling loop transfers heat away from the first stage towards the output connected to the cryocooler. The device also contains a thermal energy storage device is arranged along the cooling path and the first cooling loop.

In addition to one or more of the features described above, or as an alternative to any of the foregoing embodiments, a cryocooler device, which includes a second cooling loop which transfers heat away from a second stage towards the output connected to the cryocooler. The device also contains a thermal energy storage device, that is arranged along the cooling path and the second cooling loop.

In addition to one or more of the features described above, or as an alternative to any of the foregoing embodiments, a cryocooler device, wherein the cryocooler contains multiple stages, multiple cooling loops, and multiple thermal energy storage devices.

In addition to one or more of the features described above, or as an alternative to any of the foregoing embodiments, a cryocooler device, that has a first cooling loop that transfers heat away from a first stage towards a thermal sink connected to the cryocooler. The device also contains a first thermal energy storage device that arranged along the cooling path and the first cooling loop. The device also contains a second cooling loop transfers heat away from the second stage towards a thermal sink connected to the cryocooler. The device also contains a second thermal energy storage device that is arranged along the cooling path and the second cooling loop.

In addition to one or more of the features described above, or as an alternative to any of the foregoing embodiments, a method for cooling an engine. The method comprising providing an electric engine. Further providing, a cryocooler device in thermal communication with the electric engine, that cools the electric engine. The cryocooler device comprising: a cryocooler including an input and an output, the input forming a cooling path, and a first stage that cools a working fluid in the cooling path. The device also contains cooling loop thermally connected to the first stage that transfers heat away from the first stage towards the output of the cryocooler. Additionally, at least one thermal energy storage device selectively connectable to the cooling path and the cooling loop. A first operational mode of the cryocooler device, wherein the at least one thermal energy storage device is connected to the cooling loop and the heat to be removed at the input exceeds a cooling capacity of the cryocooler device. A second operational mode of the cryocooler device, wherein the at least one thermal energy storage device is connected to the cooling path, where the heat to be removed is less than the cooling capacity of the cryocooler and the heat is removed from the at least one thermal energy storage device. Further, operating the cryocooler device to increase the relative cooling power by providing the working fluid to the first stage through the cooling path, wherein the thermal energy storage device is in a first operation to the cooling loop. Alternatively, operating the cryocooler to decrease the relative cooling power by providing a working fluid to the first stage and the thermal energy storage device through the cooling path, wherein the thermal energy storage device is in a second operation to the cooling path.

BRIEF DESCRIPTION OF THE DRAWING(S)

Refer now to the figure(s), which is an exemplary aspect, and wherein the like elements are numbered alike;

DETAILED DESCRIPTION

A detailed description of one or more embodiments of the disclosed apparatus is presented herein by way of exemplification and not limitation with reference to the Figures.

One of the problems encountered in some applications is that the total heat load which must be removed by the cryocooler, from the component being cooled and due to heat leakage, may vary over wide ranges during operating conditions. The heat loading is normally at a steady-state level, but it occasionally peaks to higher levels as, for example, during take-off before falling back to the steady-state level, or a lower level, such as at cruise. One way to ensure adequate cooling operations is to oversize the cooler. However, this will result in added weight and large excess capacity at times when less cooling ability (e.g., during cruise) is needed.

Detailed herein is a cryocooler device, that can be sized down while providing the appropriate level of cooling by adding a thermal energy storage device to a cryocooler. The thermal energy storage device is configured to provide additional cooling ability to the cryocooler. Further cooling ability enables additional cooling of an electric engine during take-off or other high motor usage times. In operation, the disclosed cryocooler can be in thermal communication with the electric engine through a cooling path containing a working fluid. The cryocooler device further contains a cooling loop that selectively transfers heat across the cryocooler device, towards an output. The cryocooler can be connected to an output, such as a thermal sink, which removes heat from the cryocooler device. When less cooling power is needed, and in order to remove heat from the thermal energy cooling device, the working fluid is passed through the thermal energy storage device. When increased cooling is needed, the cooling loop can have further cooling ability through thermal connection to the thermal energy storage device. In an embodiment, the cryocooler device contains one or more cooling stages and one or more thermal energy storage devices.

Figure 1A:
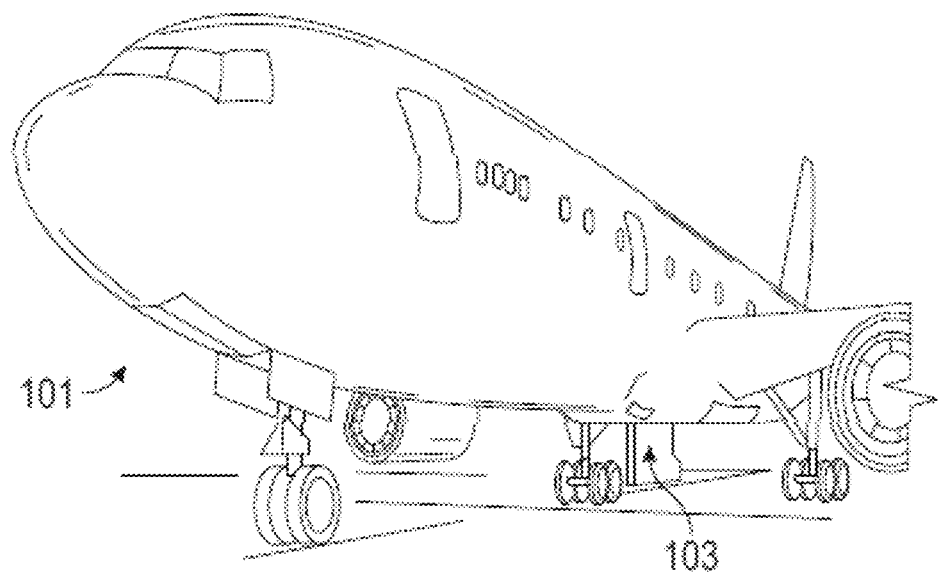
FIG. 1A is a schematic illustration of an aircraft.
Figure 1B:
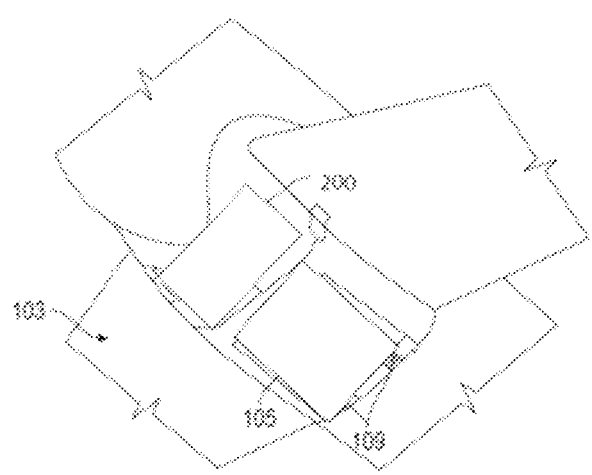
FIG. 1B is a schematic illustration of the belly of an aircraft.

FIG. 1A and FIG. 1B are schematic illustrations of a conventional aircraft 101. The aircraft 101, includes an engine with a cryocooler device 200. The engine 105 is in thermal communication with a cryocooler device 200. As illustrated, the engine 105 is in thermal communication with the cryocooler device 200 through external pipes 109. These pipes can be connected to and form part of the cooling loop discussed above.

Electric motors designed for aviation often utilize superconducting elements, which require further cooling in order to operate effectively. As discussed above, while not shown in FIG. 1, the cryocooler device 200 can include a thermal energy cooling device that allows it to provide extra cooling during stress (e.g., takeoff) operation of the engine 105.

Figure 2:
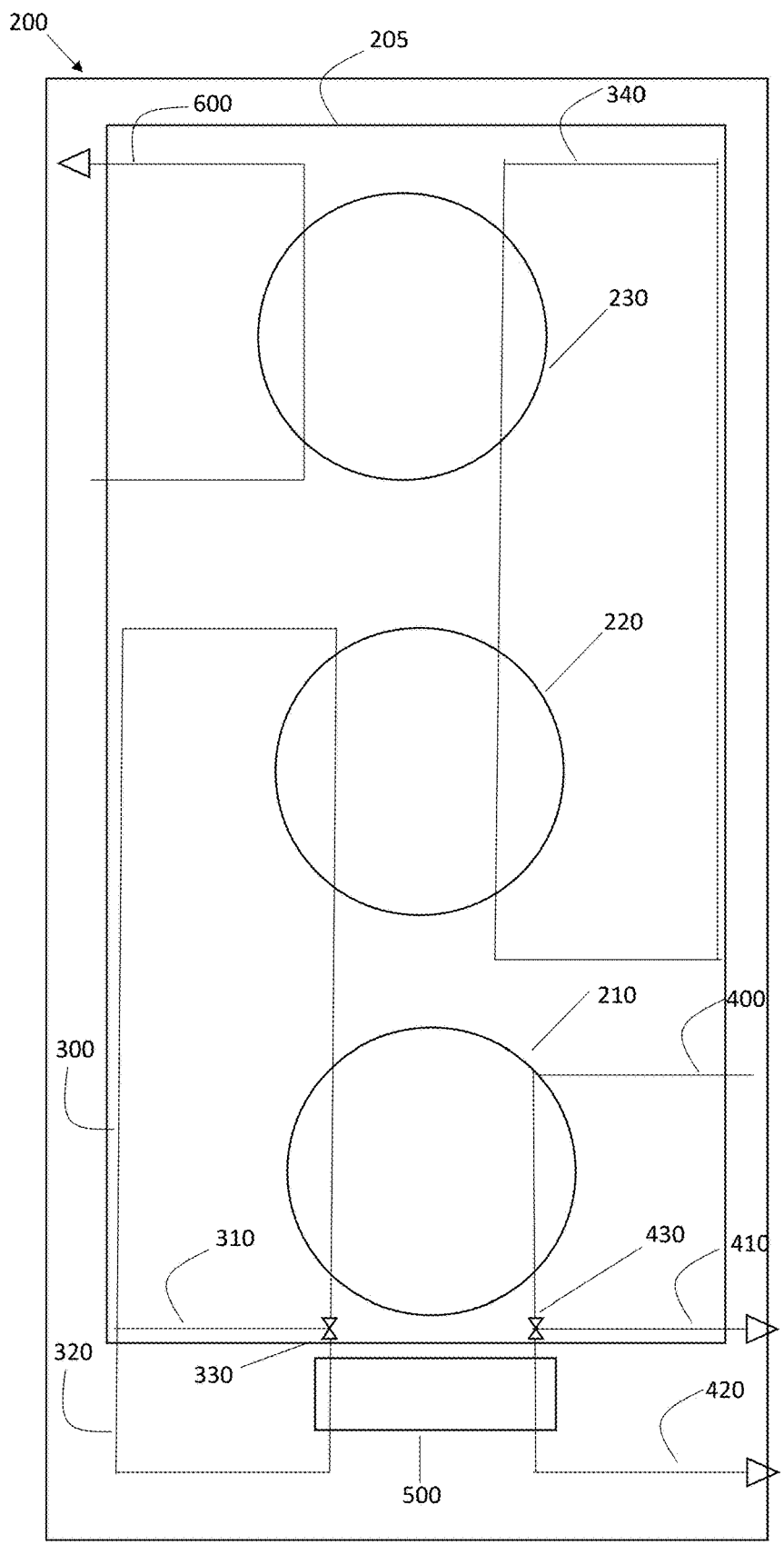
FIG. 2 is a schematic illustration of a cryocooler with transient thermal storage according to one embodiment.

In reference to FIG. 2, an example cryocooler device 200 is illustrated. The cryocooler 205 included in the cryocooler device 200 may be any appropriate form of cryocooler. For instance, the cryocooler 205 in the cryocooler device 200 could be a sterling cryocooler, a magnetocaloric cryocooler, pulse tube cryocooler, a helium cryocooler, or a polycold cryocooler.

In an embodiment, the cryocooler device 200 has a first stage 210 in thermal communication with the cooling path 400. The cooling path 400 contains a working fluid in thermal communication with the engine. By passing the working fluid through the cryocooler device 200 through the cooling path 400, the working fluid gives off heat which passes through the first stage 210. The working fluid is cooled prior to exiting the cryocooler device 200 through cooling path intermediary exit pipe 410 or cooling path final exit pipe 420.

The heat then passes through the first stage 210 to first cooling loop 300. The cooling loops 300, 340 are in thermal communication with the stages 210, 220, 230, such that they can move heat away from the stage and through the cooling loop. The first cooling loop cycles the heat away from the first stage 210 towards the output 600. Output 600, which may be a connected to an external thermal sink, moves the heat out of the cryocooler device 200.

In an embodiment, the cryocooler device 200 contains multiple stages and multiple cooling loops. The stages are in sequence with each other. Following, the heat can be moved through the cooling loops into another stage. As depicted in FIG. 2, the heat moves from first stage 210 through first cooling loop 300 to second stage 220. The heat is then moved through second stage 220 to second cooling loop 340. Upon entry to second cooling loop 340, the heat is transferred to third stage 230. Through third stage 230 the heat is transferred to output 600, upon which it exits the cryocooler device 200.

In an embodiment, the heat can migrate through the first cooling loop 300 through the entirety of the first cooling loop 300 or through a section of the first cooling loop 300 through the first cooling loop pipe 310. Through the cooling loop orifice 330, the movement of heat through the entirety of first cooling loop 300 through first final cooling loop pipe 320. Alternatively, the movement of heat can be directed through a portion of the first cooling loop 300 through the first cooling loop pipe 310.

As the heat migrates through the various stages the temperature profile increases. In an embodiment, the first stage 210 is between 20° K and 50° K, 20° K and 30° K, 30° K and 40° K, 40° K and 50° K, but preferably 20° K. The second stage 220 is between 20° K and 50° K, 20° K and 30° K, 30° K and 40° K, 40° K and 50° K, but preferably 30° K. The third stage 230 is between 20° K and 50° K, 20° K and 30° K, 30° K and 40° K, 40° K and 50° K, but preferably 40° K.

The working fluid can exit the cryocooler device 200 through two different exit pipes, the cooling path intermediary exit pipe 410 or the cooling path final exit pipe 420. In order to control the path of the working fluid, the cooling path orifice 430 can be utilized to direct the working fluid to the cooling path intermediary exit pipe 410 or the cooling path final exit pipe 420. Upon exit, the working fluid flows back into the engine and cools the engine.

In an embodiment, the first thermal storage device 500 is in thermal communication with the stage or stages that makeup the cryocooler device 200. In an embodiment, the first thermal storage device 500 is in thermal communication with the first cooling loop 300 and the cooling path 400. Through its placement on the first cooling loop 300 and the cooling path 400, the first thermal storage device 500 is in thermal communication with the first stage 210.

The first thermal storage device 500 can be made out of an appropriate medium that is able to freeze at a lower temperature. For instance, the storage medium may be made out of Neon. Further, depending on the temperature requirements, the storage medium made be made out of other material. For example, liquid to gaseous Neon, Argon, Methane, Helium, Hydrogen, or Nitrogen.

Figure 3A:
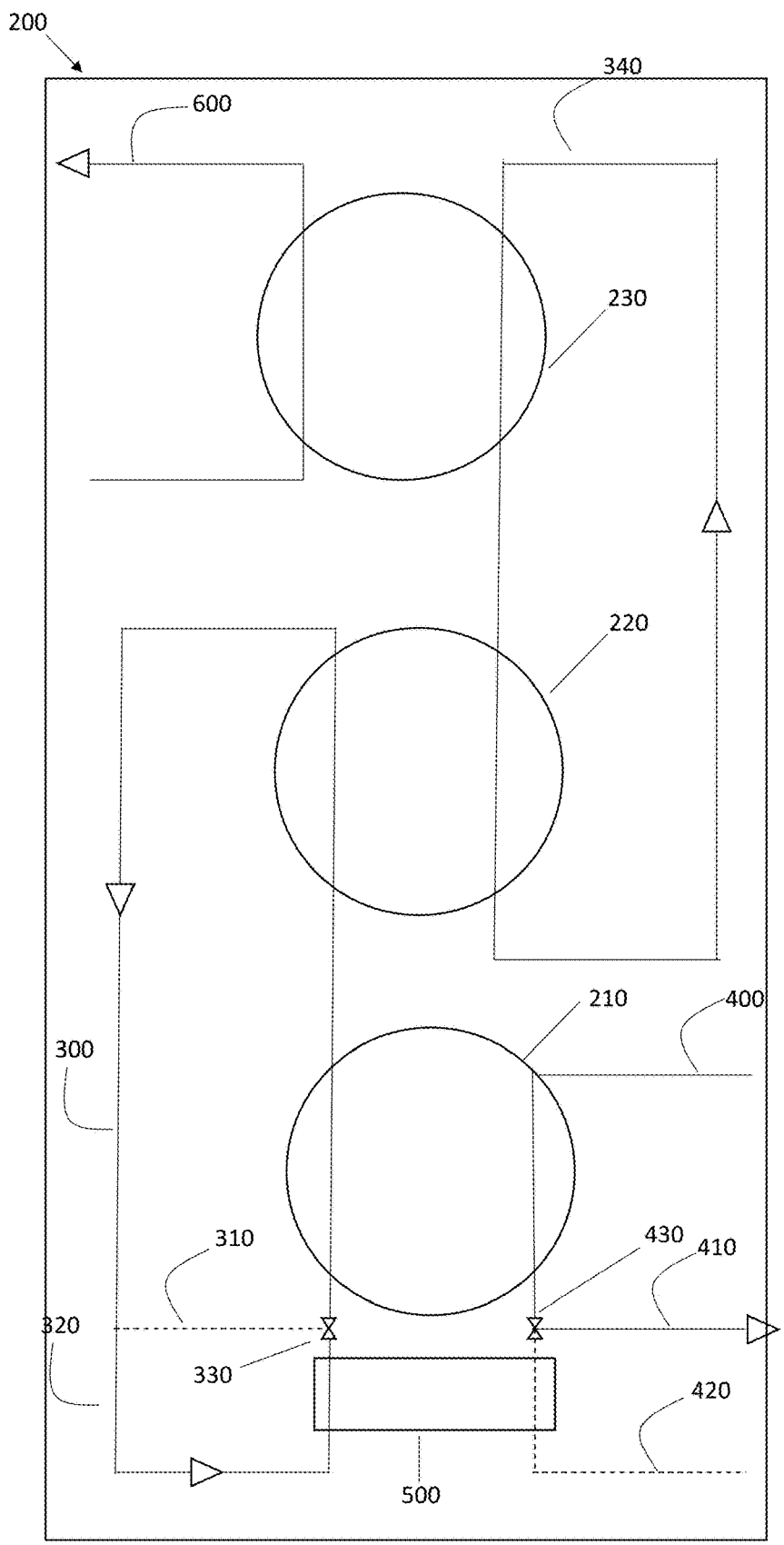
FIG. 3A is a schematic illustration of an embodiment of a cryocooler with transient thermal storage.

The orifices 330, 430 control how the thermal storage device interacts with the first cooling loop 300 and the cooling path 400. Further cooling is often needed during take-off, when loads are higher and thermal losses need to be managed. When further cooling is needed, the thermal energy storage device can provide further cooling acting as a thermal sink. As depicted in FIG. 3A, the cooling loop orifice 330 operates to control the cooling loop to enable interaction with first thermal storage device 500.

In FIG. 3A, the cooling loop orifice 330 is operated to direct thermal communication through the first final cooling loop pipe 320 of first cooling loop 300. The working fluid moves through the cooling path 400 and through the cooling path intermediary exit pipe 410. Following, the working fluid does not pass through first thermal storage device 500. The cooling path orifice 430 operates to control the flow of the working fluid through the first thermal storage device 500. The thermal interaction of the first cooling loop 300 with the first thermal storage device 500 enables further cooling ability.

Figure 3B:
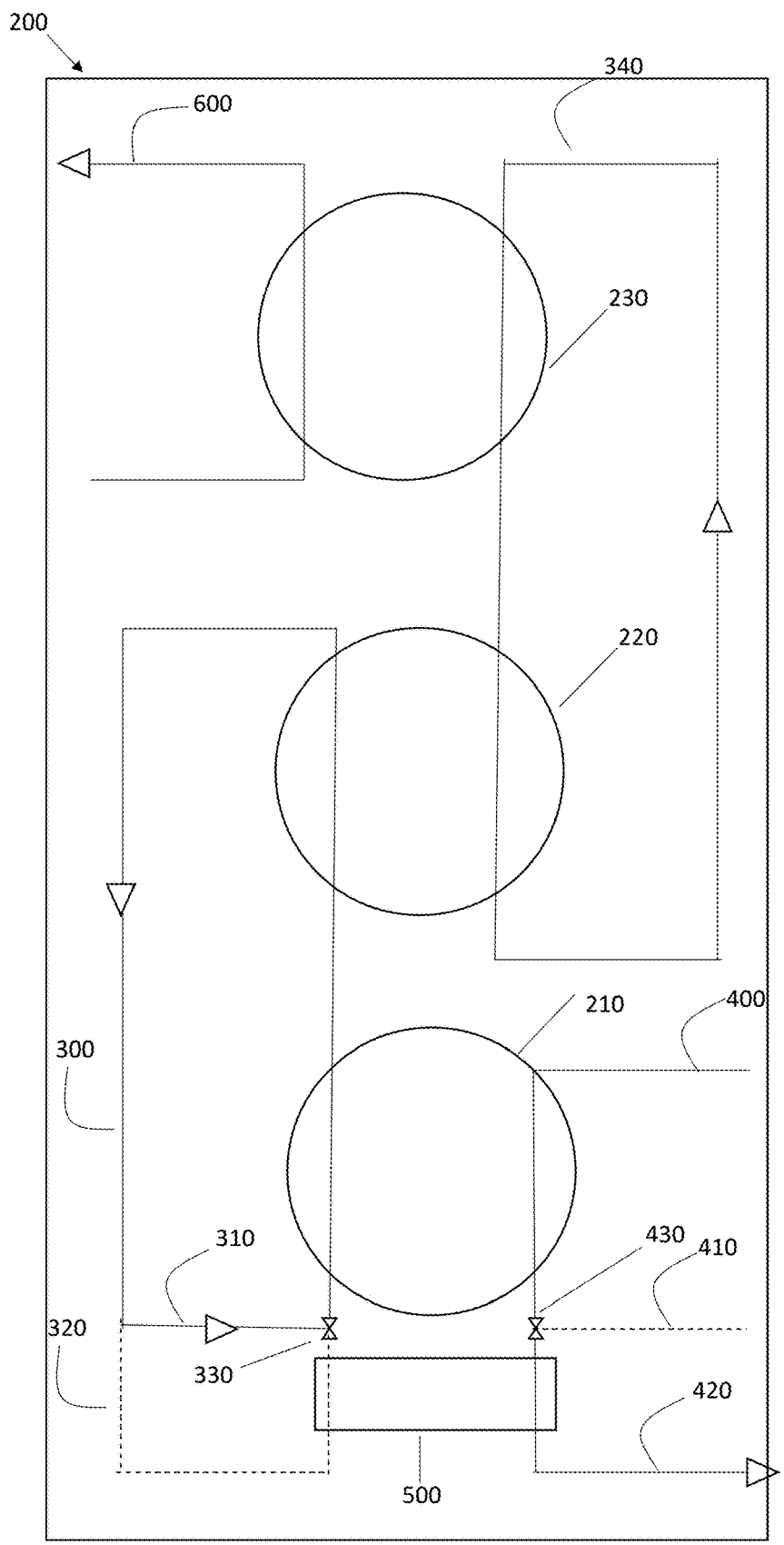
FIG. 3B is a schematic illustration of an embodiment of a cryocooler with transient thermal storage.

When the need to manage thermal losses is lower, such as during steady cruise, the first thermal storage device 500 can be recharged. As depicted in FIG. 3B, the first thermal storage device 500 can be recharged through the cooling path 400. By operation of the cooling path orifice 430, the cooling path 400 can flow of the working fluid through the first thermal storage device 500. The working fluid will move through the cooling path and out the cooling path final exit pipe 420. The cooling loop orifice 330 can be operated such that the first cooling loop 300 does not interact with the first thermal storage device 500. Meaning the cooling loop orifice 330 is operated to enable thermal energy to flow through the first cooling loop 300 through the first cooling loop pipe 310. This flow will recharge the first thermal energy storage device, enabling later usage when loads are high and thermal loses need to be managed.

Figure 4:
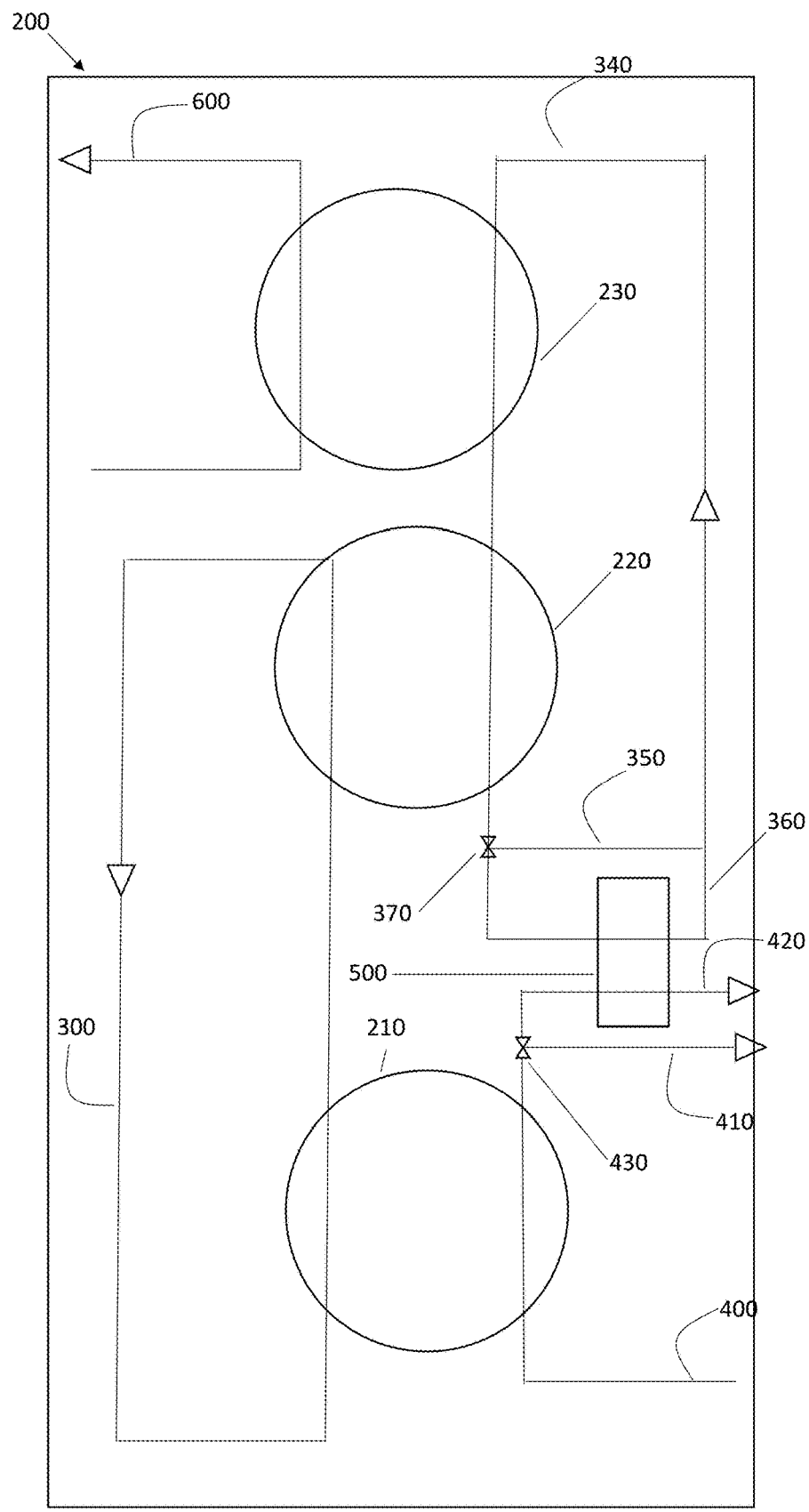
FIG. 4 is a schematic illustration of an embodiment of a cryocooler with transient thermal storage.

In an embodiment, the thermal energy storage device can be used on other cooling loops. The placement on other cooling loops enables further cooling ability for other stages. As depicted in FIG. 4, the first thermal storage device 500 is positioned on the second cooling loop 340. In order to control the flow of thermal energy, the second cooling loop 340 has a second cooling loop orifice, which controls the flow through either the second intermediary cooling loop pipe 350 or the second final cooling loop pipe 360.

Through this configuration, the flow of thermal energy through second stage 220 can be controlled. In FIG. 4, the flow of working fluid can be controlled through the cooling path 400. The cooling path orifice 430 operates to control the flow of the working fluid through the first thermal storage device 500. The working fluid moves through the cooling path 400 and through the cooling path intermediary exit pipe 410 or the cooling path final exit pipe 420.

The orifices 370, 430 control how the thermal energy storage device interacts with the second cooling loop 340 and the cooling path 400. When further cooling is needed, the thermal energy storage device can provide further cooling acting as a thermal sink by operating the second cooling loop orifice 370 to direct thermal communication through the second final cooling loop pipe 360 of second cooling loop 340, while diverting the working fluid through the cooling path intermediary exit pipe 410. When less cooling ability is needed, the first thermal storage device 500 can be recharged by flowing the working fluid through the cooling path 400. By operation of the cooling path orifice 430, the cooling path 400 can flow of the working fluid through the first thermal storage device 500. The working fluid will move through the cooling path and out the cooling path final exit pipe 420. The second cooling loop orifice 370 can be operated such that the second cooling loop 340 does not interact with the first thermal storage device 500. Meaning the second cooling loop orifice 370 is operated to enable thermal energy to flow through the second cooling loop 340 through the second intermediary cooling loop pipe 350.

Figure 5A:
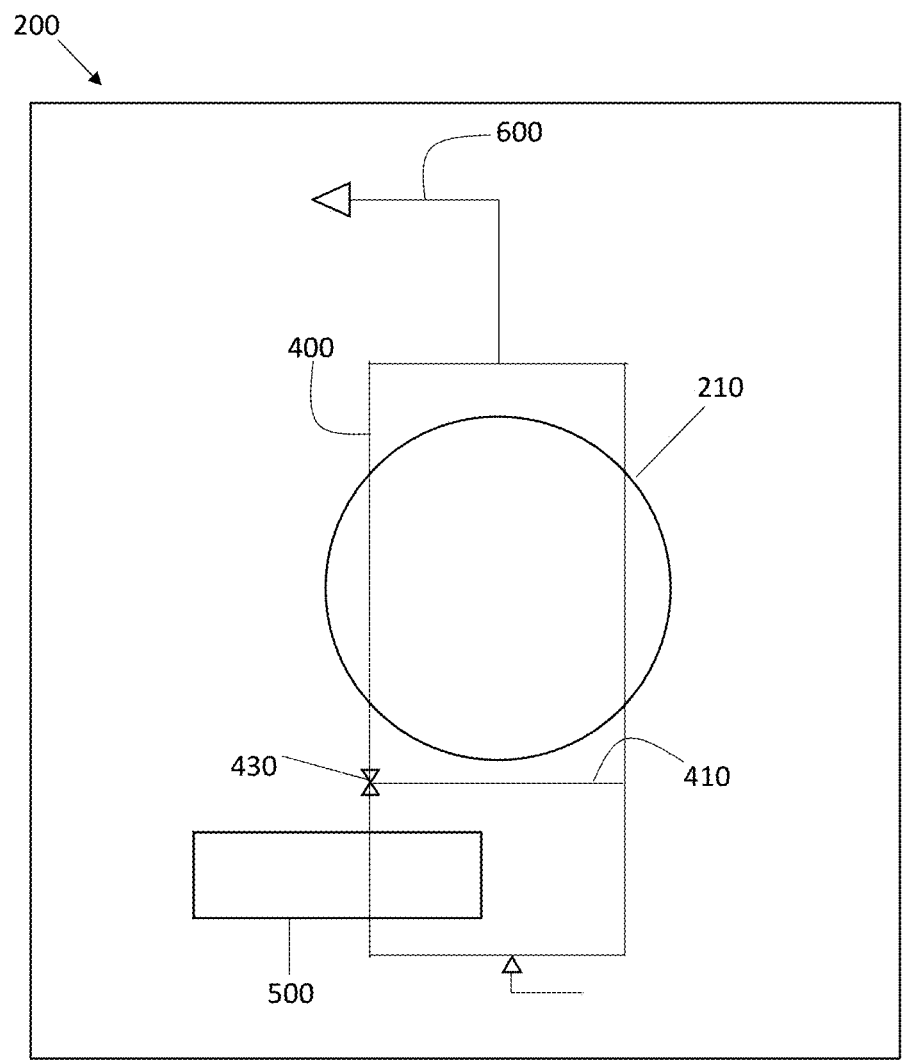
FIG. 5A is a schematic illustration of an embodiment of a cryocooler with transient thermal storage.
Figure 5B:
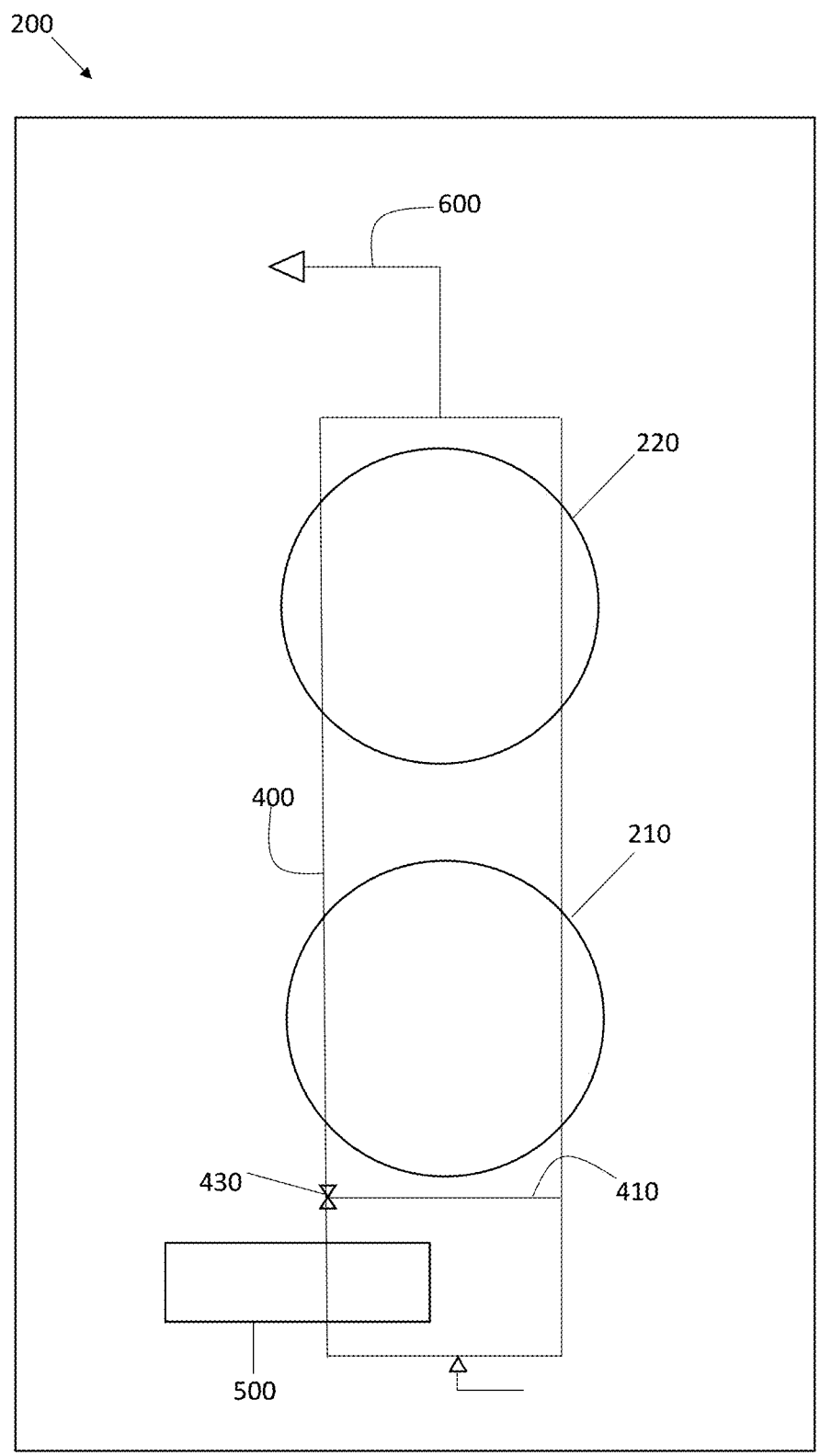
FIG. 5B is a schematic illustration of an embodiment of a cryocooler with transient thermal storage.

FIG. 5A and FIG. 5B depict configurations of a cryocooler device 200 with one stage and two stages respectively. In FIG. 5A, the first thermal storage device 500 is in thermal communication with the first stage 210. The flow of the working fluid through the first stage 210 and the first thermal storage device 500 is controlled through the cooling path orifice 430. The heat enters into cryocooler device 200 through the cooling path 400 and then exits through the output 600. The cooling path orifice 430 operates to control the flow of working fluid through the cooling path 400 and out through the cooling path intermediary exit pipe 410. In FIG. 5B, a cryocooler device 200 with two stages is shown. The two stages are in sequence with each other. Following, the heat enters the cryocooler device 200 and can be moved from one stage to another through the cooling path 400. The heat moves from first stage 210 to second stage 220, the heat is then moved out of the cryocooler device 200 through the output 600.

In addition to interactions with the second cooling loop, there could be multiple thermal storage devices in the cryocooler, interacting with various stages and cooling loops. Multiple thermal storage devices would enable further cooling ability for the cryocooler device and would enable further cooling of the stages.

The use of the terms "a," "an," "the," and similar references in the context of description (especially in the context of the following claims) are to be construed to cover both the singular and the plural, unless otherwise indicated herein or specifically contradicted by context. The modifier "about," "substantially," and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

Accordingly, the present disclosure is not to be seen as limited by the foregoing description but is only limited by the scope of the appended claims.

What is claimed is:

1. A cryocooler device comprising:
   a cryocooler including an input and an output, the input forming a cooling path, and a first stage that cools a working fluid in the cooling path;
   a cooling loop thermally connected to the first stage that transfers heat away from the first stage towards the output of the cryocooler; and
   a thermal energy storage device selectively connectable to the cooling path and the cooling loop, wherein in a first operational mode of the cryocooler device where the at least one thermal energy storage device is connected to the cooling loop where the heat to be removed at the input exceeds a cooling capacity of the cryocooler device, and a second operational mode where the at least one thermal energy storage device is connected to the cooling path where the heat to be removed is less than the cooling capacity of the cryocooler and the heat is removed from the at least one thermal energy storage device.

2. The cryocooler device of claim 1, wherein the thermal energy storage device includes a working fluid selected from the group consisting of Neon, Argon, Methane, Helium, Hydrogen, and Nitrogen.

3. The cryocooler device of claim 1, wherein the cryocooler is a sterling cryocooler, a magnetocaloric cryocooler, pulse tube cryocooler, a helium cryocooler, or a polycold cryocooler.

4. The cryocooler device of claim 1, wherein the cryocooler contains multiple stages and multiple cooling loops.

5. The cryocooler device of claim 1, wherein the cryocooler contains at least two stages and at least two cooling loops.

6. The cryocooler device of claim 5, wherein the at least two cooling loops includes a first cooling loop that transfers heat away from a first stage towards the output connected to the cryocooler, wherein the thermal energy storage device is arranged along the cooling path and the first cooling loop.

7. The cryocooler device of claim 5, wherein the at least two cooling loops includes a second cooling loop that transfers heat away from a second stage towards the output connected to the cryocooler, wherein the thermal energy storage device is arranged along the cooling path and the second cooling loop.

8. An aircraft system comprising:
an electric engine;
a cryocooler device as recited in claim 1 in thermal communication with the electric engine that cools the electric engine.

9. The aircraft system of claim 8, wherein the thermal energy storage device includes a working fluid selected from the group consisting of Neon, Argon, Methane, Helium, Hydrogen, and Nitrogen.

10. The aircraft system of claim 8, wherein the cryocooler is a sterling cryocooler, a magnetocaloric cryocooler, pulse tube cryocooler, a helium cryocooler, or a polycold cryocooler.

11. The aircraft system of claim 8, wherein the cryocooler contains multiple stages and multiple cooling loops.

12. The aircraft system of claim 8, wherein the cryocooler contains at least two stages and at least two cooling loops.

13. The cryocooler device of claim 12, wherein a first cooling loop transfers heat away from the first stage towards the output connected to the cryocooler, wherein the thermal energy storage device is arranged along the cooling path and the first cooling loop.

14. The cryocooler device of claim 12, wherein a second cooling loop transfers heat away from the second stage towards the output connected to the cryocooler, wherein the thermal energy storage device is arranged along the cooling path and the second cooling loop.

15. A method for cooling an engine, comprising:
providing an electric engine;
providing a cryocooler device in thermal communication with the electric engine, that cools the electric engine, the device comprising:
a cryocooler including an input and an output, the input forming a cooling path, and a first stage that cools a working fluid in the cooling path;
a cooling loop thermally connected to the first stage that transfers heat away from the first stage towards the output of the cryocooler; and
a thermal energy storage device selectively connectable to the cooling path and the cooling loop, wherein in a first operational mode of the cryocooler device where the at least one thermal energy storage device is connected to the cooling loop the heat to be removed at the input exceeds a cooling capacity of the cryocooler device, and a second operational mode where the at least one thermal energy storage device is connected to the cooling path where the heat to be removed is less than the cooling capacity of the cryocooler and the heat is removed from the at least one thermal energy storage device,
operating the cryocooler device to increase the relative cooling power by providing the working fluid to the first stage through the cooling path, wherein the thermal energy storage device is in a first operation to the cooling loop, operating the cryocooler to decrease the relative cooling power by providing a working fluid to the first stage and the thermal energy storage device through the cooling path, wherein the thermal energy storage device is in a second operation to the cooling path.

* * * * *